Dec. 24, 1968 J. HORZICK 3,417,998

VERTICAL RECORD PLAYER

Filed April 18, 1967

INVENTOR
JOSEPH HORZICK

BY Mueller, Aichele & Rauner

ATTORNEYS.

United States Patent Office
3,417,998
Patented Dec. 24, 1968

3,417,998

VERTICAL RECORD PLAYER

Joseph Horzick, West Chicago, Ill., assignor to Motorola, Inc., Franklin Park, Ill., a corporation of Illinois Filed Apr. 18, 1967, Ser. No. 631,631
7 Claims. (Cl. 274—10)

ABSTRACT OF THE DISCLOSURE

This record player utilizes a vertical turntable and an automatic record changer adapted to receive various size records. The changer includes a record loading arm that functions to position the records to the turntable spindle and also holds them firmly in place on the spindle record shelf. An adjustable record support is slidably mounted to the loading arm and is variable to index the center hole in the various size records with the spindle.

*Background of the invention*

This invention pertains generally to sound reproducing apparatus and more particularly to a vertical record player having an automatic record changer.

Various vertical record players have been developed but in general these players have not been adapted to use the relatively inexpensive, conventional automatic record changing apparatus common to the standard horizontal turntable player. Such conventional apparatus frequently utilizes a center spindle which has a record shelf for supporting the record thereon, and a push off lever for moving the next record to be played off the record shelf so that gravity causes the record to tumble down the spindle to the turntable. One reason for not using this conventional changing apparatus has been that the record support arm commonly used with it is not suitable for supporting a vertical stack of records. Furthermore, there has generally been an annoying problem with this system in locating the center hole in the record to the spindle, this generally being accomplished in a "hit and miss" fashion.

*Summary of the invention*

It is an object of this invention to provide a vertical record player that permits convenient alignment of the center hole in the record with the turntable spindle.

It is another object of this invention to provide a record changer for a vertical record player that is convenient to load.

It is a further object of this invention to provide a record changer for a vertical record player that uses a unique loading arm for indexing the center hole of the record to the turntable spindle and which cooperates with the record shelf on the spindle to support the record thereon.

In one embodiment of this invention, a record player has a substantially vertical turntable, and an automatic record changer adapted to use records of varying diameters. The record changer includes a spindle which extends substantially normal to the turntable and which has a record shelf integral therewith for supporting a stack of records thereon. A push off lever moves the next record to be played off the shelf and permits it to travel down the spindle to engage the turntable upon the completion of the playing of the record. A tone arm engages the record on the turntable to reproduce the recorded sound. A loading mechanism for the record changer includes a loading arm pivotally connected at one end to the player. A spring biases the arm to a first position away from the spindle for loading the records onto the arm and into engagement with two projections that form part of a record support device. The projections are slidably mounted to the arm in a spaced relation to form a seat for the records and are adjustable so that when a record is set into position on the seat, the circumference of the record strikes the projections thereby aligning the center hole of the record to the spindle. The projections can be adjusted by sliding them along the arm to accommodate records of varying diameter.

Movement of the arm about the pivot through a vertical plane actuates the spring to bias the arm to a second position to position the records on the spindle and into engagement with the record shelf. The arm cooperates with the shelf to firmly support the records on the spindle.

*Detailed description*

Figures 1, 2, 3, 4:
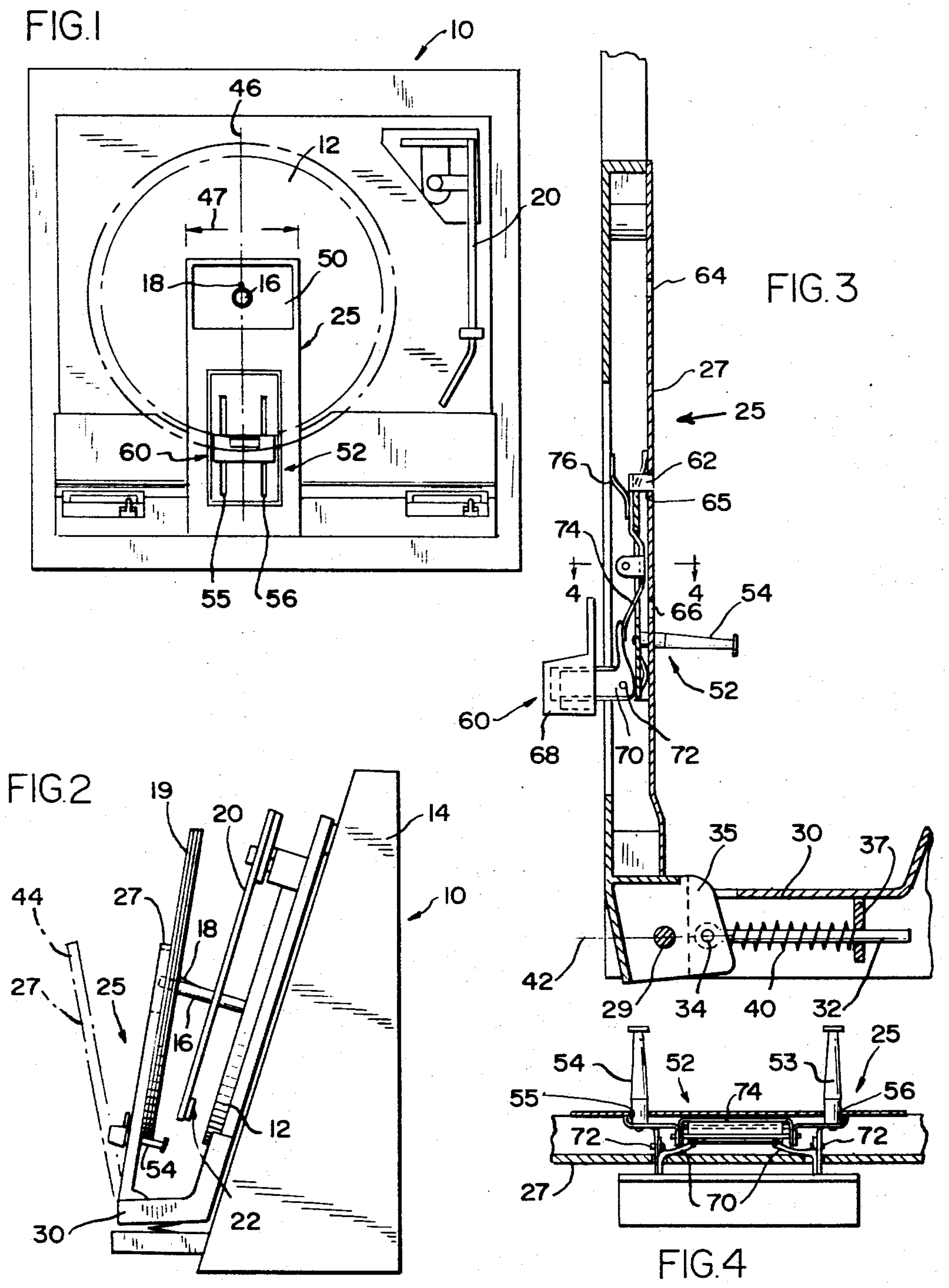
FIG. 1 is a front elevation view of the record player in accordance with this invention.
FIG. 2 is a side elevation view of the record player of FIG. 1.
FIG. 3 is an enlarged side elevation view in cross-section of a portion of the record player of FIG. 1.
FIG. 4 is a top plan view in cross-section taken along the line 4—4 of FIG. 3.

Referring to the figures of the drawings, FIGS. 1 and 2 illustrate a record player 10 that has a turntable 12 which is driven by a motor in a conventional manner at a rate depending on the speed necessary to play back the sound recorded on the record. For instance, the player could have three speeds for playing back the conventional 33⅓ r.p.m., 45 r.p.m. and 78 r.p.m. records. Turntable 12 is mounted in a player cabinet 14 in a substantially vertical plane. That is, in a plane that is inclined less than a 45° angle from the vertical. By locating the turntable 12 in a substantially vertical plane, it is possible to design the entire record player 10 along very slim lines so that it can be played in confined spaces such as on bookshelves, in cabinets, and the like.

The record player 10 has an automatic record changer which includes a spindle 16 that extends in a direction substantially normal to the turntable 12 and which has a record shelf 18 integral therewith for supporting a stack of records 19 on the spindle. A push off lever (not shown) which is conventional with record changers of this type is used to move the next record to be played off the shelf. The weight of the record causes the same to tumble down the titled spindle to the turntable. A tone arm 20 engages the record on the turntable to produce the recorded sound. It has been found that even though the turntable is tilted to nearly a vertical plane, the weight of the tone arm is sufficient to keep the needle 22 in the groove of the record for playing back the recorded sound.

In operation, when the tone arm has reached the end of the playing of one record, the changer mechanism will be activated to lift the tone arm off the record and move it to the stored position as shown in FIG. 1. Subsequent to this action, the push off lever will be activated to move the next record in the stack off the record shelf 18 and onto the spindle where it tumbles to the turntable 12. The tone arm is then moved once again from the stored position onto the record to reproduce the recorded sound thereon. What has been described so far, therefore, is a phonograph 10, which has a vertical turntable 12, but which utilizes a conventional record changer that operates in the known manner.

Because the records must be supported in a vertical plane on the spindle 16, the conventional record support arm which is normally used with this type of record changing apparatus is not satisfactory. The record loading mechanism 25 of this invention was developed to perform the function of the record support arm and in addition other important functions which will be described subsequently.

FIGS. 3 and 4 illustrate in detail the construction of the record support mechanism 25. The mechanism 25 includes a loading arm 27 that is pivotally connected at 29 to a bracket 30, which is fixed to the cabinet 14 of the record player 10. (Since the arm 27 is connected in the same manner on both sides, a detailed description for only one side will be included.) A rod 32 is pivotally connected at 34 to foot portion 35 of the arm 27 and is slidably mounted in bracket 37 connected to the bracket 30. A compression spring 40 fits around the rod 32 and is compressed between the bracket 37 and the end of the rod at pivot 34. The pivot 34 of the rod 32 moves with the leg 35, when the arm 27 is moved, and about pivot point 29. Because of this, spring 40 provides what is known as over center spring action. With the arm 27 located in the vertical as shown in FIG. 3, the force of the spring 40 will be along the same center line 42 as pivot 29 so that the spring will exert no force on foot portion 35 of the arm 27. However, if the arm is moved in a counter clockwise direction as illustrated in FIG. 3, the pivot 34 will move with the arm to a point above the center line 42 such that the spring will exert a moment of force on the foot portion 35 of the arm 27 thereby biasing the arm into a convenient position for loading records thereon as shown in phantom at 44 in FIG. 2. Likewise, if the arm 27 is moved clockwise as viewed in FIG. 3, the pivot 34 will move below the center line 42, causing the spring 42 to exert a moment of force on foot portion 35 to bias the arm 27 to a second position shown in FIG. 2 so that the spring, through the arm 27, biases the records 19 against the record shelf 18.

The arm 27 as shown in FIGS. 1 and 2 is a substantially flat member and is pivotally connected to the cabinet 14 in a manner that the width 47 of the arm extends on either side of a line 46 that passes through the center of the spindle 16 and the records mounted on the spindle shelf. The length of the arm 27 is such that it engages the record on the line 46 above and below the spindle 16. There is an opening 50 in the arm 25 that permits the spindle to pass through the arm so that it can engage the records. It can be seen, therefore, that the arm 27 applies equal pressure on the record 19 completely about the spindle 16 so that the record is firmly supported between the shelf 18 and the arm.

The loading mechanism 25 also includes a support device 52. The support device 52 includes a pair of projections or cam surfaces 53 and 54 that are slidably mounted within the arm 27. The projections extend through channels 55 and 56 in the arm 27 and are free to move up and down in these channels. A spring loaded lever 60 acts to lock and unlock the projections 53 and 54 in the channels 55 and 56 at different positions along the arm 27.

The locking action is provided by a pair of pawls 62 that are engageably held in one set of the notches 64, 65 and 66. Locking the pawls 62 in the pairs of the notches effectively positions the projections 53 and 54, depending on the size of the record being used. For instance, the notches 66 could be used for records having a diameter corresponding to a 33⅓ r.p.m. recording rate, the notches 65 for 78 r.p.m. records, and the notches 64 for 45 r.p.m. records. The locking device 60 is operated by applying pressure with the fingers beneath the outer shell 68, causing the arm 70 to pivot about pivot 72. This pivots the rocker 74 to bias the pawls 62 against the pair of leaf springs 76, and out of the slots. The projections 53 and 54 are then free to be slid up and down in the channels 55 and 56, and the springs 76 will bias the pawls into the next set of notches to which the support device 62 is moved.

In operation, the arm 25 is tilted out of the vertical plane and biased by spring 40 to the position shown in FIG. 2 for loading the records onto the loading arm 27 and into engagement with the projections 53 and 54. The projections 53 and 54 form a seat for supporting the records. Furthermore, the projections 53 and 54 lie in the same substantially horizontal plane as shown in FIG. 3, and the slots 55 and 56 in the arm 27 are located so that they are equidistantly spaced from the center line 46 that passes through the spindle 16. Therefore, when a record is seated on the projections, they intersect the circumference of the circle of the record at two points to position the record to the spindle 16. The arm 27 is then moved through the vertical plane until spring 40 biases the arm 27 to position the center holes in the records over the spindle 16 and against the record shelf 18. The arm also acts to firmly support the records on the shelf 18 so that they will not wobble as previously described.

When the record player is actuated, the push off lever moves a record in the conventional manner off the shelf and it slides down the spindle 16 and into engagement with the turntable 12 for playing. The tone arm 20 then swings from its stored position shown in FIG. 1 onto the record. When the record has been completed the tone arm returns to its stored position and the next record on the shelf is moved by the push off lever down the spindle onto the turntable. This operation continues until the last record on the record shelf is played at which time the record player is turned off.

What has been described, therefore, is a vertical record player that uses a unique loading arm which not only properly indexes the hole in the center of the record to the spindle, depending on the diameter of the record, but also firmly supports the stack of records on the record shelf after the loading arm has moved the records over the spindle and onto the shelf.

I claim:

1. In a record player including in combination, rotatable table means for supporting the records during playback, said table means being positioned in a substantially vertical plane, spindle means extending from said table means, movable loading means coupled to the player, and support means movably connected to said loading means to form a seat for supporting a stack of records with the same being positioned on said loading means in a substantially vertical position, said support means having a predetermined position for indexing the holes in the center of the records placed thereon to said spindle means with said loading means being moved to position the records on said spindle means.

2. The record player of claim 1 which is capable of playing records of different diameters wherein said support means is movable between a plurality of predetermined positions for indexing the hole in the center of each of the different records to said spindle means.

3. The record player of claim 1 wherein said loading means is pivotally connected at one end to the record player, and the player further includes spring means resiliently biasing said loading means about said pivot between first and second positions, said loading means being biased to said first position for placing a record thereon in engagement with said support means, and said loading means being biased to said second position for positioning a record on said spindle means.

4. In sound reproducing apparatus including, an automatic record changer adapted to use records of varying diameters and having a substantially vertical turntable, the record changer comprising a spindle extending substantially normal to the turntable which has shelf means integral therewith for supporting a stack of records thereon, the combination including, a loading mechanism for the record changer comprising an arm pivotally connected at one end to the apparatus, and record support means slidably connected to said arm to form a seat for supporting a stack of records with the same being positioned on said arm, said support means being adjustable to index a hole in the center of each record with the spindle, with said arm being pivoted to position the records on the shelf means of the spindle.

5. The sound reproducing apparatus of claim 4 wherein said loading mechanism further includes spring means biasing said arm about said pivot, said spring means biasing said arm to a first position for loading a record on said arm, said spring means biasing said arm to a second position with the same being pivoted through a vertical plane to bias the record onto the spindle and against the shelf means.

6. The sound reproducing apparatus of claim 5, wherein said arm is a substantially flat member having a width extending on either side of a line passing through the center of the spindle and a record on said shelf means thereof, and having a length to engage the record on said line at each side of the spindle, said arm thereby applying equal force on all parts of the record about said spindle and cooperating with said shelf means to stably support the record on the spindle with said spring means biasing said arm to said second position.

7. The sound reproducing apparatus of claim 4 wherein said support means includes first and second projections located in a spaced relation to each other and forming a seat for the record, and wherein said arm is movable between first and second positions and includes first and second channels equidistantly spaced on either side of the spindle with said arm being pivotally coupled to the apparatus, said projections being movably connected to said arm slidable in respective channels, said arm being pivoted to said first position for loading a record onto the same and into engagement with said seat formed thereby for supporting the same, and projections each striking the circumference of the record to align the center hole thereof to the center line of the spindle, and said projections being moved in said channels to index the hole in the record with the spindle, with said arm being pivoted through a vertical plane to said second position to place the record on the shelf means of the spindle.

References Cited

UNITED STATES PATENTS

| | | | |
|---|---|---|---|
| 2,007,054 | 7/1935 | Jones et al. | 274—10 |
| 2,374,080 | 4/1945 | Dale | 274—10 |

HARRY N. HAROIAN, *Primary Examiner.*